United States Patent
Nandy et al.

(10) Patent No.: US 6,826,147 B1
(45) Date of Patent: Nov. 30, 2004

(54) METHOD AND APPARATUS FOR AGGREGATE FLOW CONTROL IN A DIFFERENTIATED SERVICES NETWORK

(75) Inventors: Biswajit B. Nandy, Kanata (CA); Jeremy G. Ethridge, Nepean (CA); Abderrahmane Lakas, Ottawa (CA); Alan S. Chapman, Kanata (CA)

(73) Assignee: Nortel Networks Limited (CA)

( * ) Notice: Subject to any disclaimer, the term of this patent is extended or adjusted under 35 U.S.C. 154(b) by 740 days.

(21) Appl. No.: 09/742,139

(22) Filed: Dec. 19, 2000

Related U.S. Application Data (60) Provisional application No. 60/220,631, filed on Jul. 25, 2000.

(51) Int. Cl.$^7$ ............................................. G01R 31/08
(52) U.S. Cl. ..................................... 370/229; 370/235
(58) Field of Search ............................. 370/229–231, 370/235–237, 252, 253, 351–3, 389, 392, 412–418, 465–467, 469, 470–6

(56) References Cited

U.S. PATENT DOCUMENTS

| | | | | |
|---|---|---|---|---|
| 6,483,805 B1 | * | 11/2002 | Davies et al. | 370/235 |
| 6,487,170 B1 | * | 11/2002 | Chen et al. | 370/231 |
| 2001/0025310 A1 | * | 9/2001 | Krishnamurthy et al. | 709/223 |

OTHER PUBLICATIONS

Kung, et al., "TCP Trunking: Design, Implementation and Performance," Div. Of Engineering and Applied Sciences, icnp099, Nov. 1999, pp. 1–10.
Floyd, et al., "Promoting the Use of End–to–End Congestion Control in the Internet," IEEE/ACM Transaction on Networking, May 3, 1999, pp. 1–16.
Floyd S., et al., "Random Early Detection Gateways for Congestion.Avoidance," IEEE/ACM Transactions on Networking, vol. 1., Aug. 1992, pp. 397–413.
Blake, et al., "An Architecture for Differentiated Services," RFC 2475, Dec. 1998.
Clark, David, et al., Explicit Allocation of Best Effort Packet Delivery Service, IEEE/ACM Transactions on Networking, vol. 6.,.
Heinanen, J., et al., "Assured Forwarding PHB Group," RFC 2597, Jun. 1999.
Seddigh, Nabil, "Bandwidth Assurance Issues for TCP Flows in a Differentiated Services Network," In Proceedings of Globecom '99, Rio De Janeiro, Dec. 1999, pp. 1–6.
Seddigh, et al., "Intelligent Traffic Conditioners for Assured Forwarding Based Differentiated Services Networks," In Proceedings of Networking 2000, Paris, France, May 2000.
Chapman, et al., "Traffic Management for Aggregate IP Streams,"In Proceedings of CCBR, Ottawa, Nov. 1999.

* cited by examiner

Primary Examiner—David Vincent
(74) Attorney, Agent, or Firm—Steubing McGuiness & Manaras LLP (57) ABSTRACT

In accordance with a method and apparatus for managing aggregate flows of data in a differentiated services (DS) network, fairness issues are improved by enforcing congestion control at the edges of the DS in a TCP-friendly manner network, rather than relying on congestion to accumulate at the core. This is done by establishing a credit system for each aggregate flow through the edge. Only if credit is available for the flow, will data from an edge node be forwarded to the edge node's DS traffic conditioner where the data packets can be marked using DiffServ labels. When credit is not available, the data will be queued at the edge node. Each time data belonging to an aggregate flow is forwarded to the traffic conditioner, the amount of credit for the flow is decremented. Credit for the flow is incremented only when control packets can be inserted into the flow. Specifically, the present invention establishes control flows associated with each aggregate flow. A control packet (i.e. a header packet) is injected into the flow for every fixed amount of data belonging to the flow. Credit generation, and hence the queueing of aggregate flow data at the edge, is thus determined by the state (or the congestion window) of the associated control flow.

25 Claims, 5 Drawing Sheets

METHOD AND APPARATUS FOR AGGREGATE FLOW CONTROL IN A DIFFERENTIATED SERVICES NETWORK

CROSS-REFERENCE TO RELATED APPLICATIONS

The present application is based on, and claims priority from, U.S. Provisional Application No. 60/220,631, filed Jul. 25, 2000 and entitled "A TCP-Friendly Edge-to-Edge Aggregate Flow Control in a Differentiated Services Network," commonly owned by the present assignee, the contents of which are incorporated herein by reference.

FIELD OF THE INVENTION

This invention relates generally to exchanging data over a data communications network and, more particularly, to managing aggregate flows between network edges so as to better prevent and manage congestion at the core of a differentiated services network.

BACKGROUND OF THE INVENTION

Differentiated services (DiffServ) has recently gained acceptance as one way to address Quality of Service (QoS) issues in an Internet Protocol (IP) network. Service Level Agreements (SLAs) are used to define flows between network domains, and the level of service to be guaranteed for those flows. In one possible example, an SLA may include a committed information rate (CIR) and a peak information rate (PIR) for each aggregate. The SLAs are enforced at the edges of the different domains by edge routers, which use the SLAs to mark packets belonging to different flows with drop precedences corresponding to the level of service guaranteed for the flow by the SLAs. For example, when a flow's measured traffic is below its CIR, its packets are marked with the lowest drop precedence, dp0. When a flow's measured traffic is above its CIR but below its PIR, its packets are marked with a higher drop precedence, dp1. When a flow's measured traffic is above its PIR, its packets are marked with the highest drop precedence, dp2.

At the core of the network, simple differentiated forwarding mechanisms are used. One example forwarding mechanism is called Assured Forwarding (AF) Per Hop Behaviors (PHB). AF PHB establishes how packets are treated at the core of the network during times of congestion. Specifically, during congestion, packets marked with a dp1 marking have a higher probability of being dropped than packets with a dp0 marking, and packets having a dp2 marking have a higher probability of being dropped than packets with a dp1 marking.

The rationale behind this scheme is that well-behaved flows (those staying within their CIR) will not be punished as severely when the network core becomes congested, so that parties to SLAs are assured a level of service in accordance with the negotiated fee for that service. However, many factors cause this scheme to become unfair with respect to factors such as bandwidth and delay.

For example, consider what happens between two aggregates, each with different numbers of micro-flows. In an over-provisioned network, the aggregate with a larger number of TCP micro-flows will obtain a greater share of the excess bandwidth, even if both aggregates are within their CIRs. This is because each TCP micro-flow will have a corresponding congestion window with a minimum segment size.

As another example, unfairness may arise from TCP-UDP interactions. In other words, a paying Diffserv customer may inject both TCP and UDP traffic into the network. The UDP traffic, which is unresponsive to congestion in the network, may adversely impact the TCP traffic. Clearly, however, responsive TCP flows should be protected from the unresponsive UDP flows, while maintaining an equal protection for UDP flows which tend to handle multimedia traffic.

Further, there is the effect of different packet sizes in aggregates. Specifically, when two aggregates send different sized TCP packets, the effect is similar two the case where to aggregates contain different numbers of microflows. All else being equal, the aggregate containing the larger packets will consume more of the available bandwidth, because the congestion windows in its TCP flows will grow more quickly.

Traffic latency and delay issues may also arise in DiffServ networks. For example, when congestion occurs in the network due to an offending aggregate, short TCP flows in a non-offending aggregate will get punished by having their traffic queued at the core along with all the other long-lived flows.

Further, inter-packet delay for streaming UDP traffic may vary depending on the presence of competing traffic from other aggregates. Congestion at core network nodes will cause traffic to be delayed by varying amounts, thereby introducing jitter. This can be a serious problem for multimedia UDP traffic.

Finally, the problems mentioned above wherein conformant aggregates are punished because of the congestion caused by non-conformant aggregates becomes even greater when there are multiple congestion points in the core.

SUMMARY OF THE INVENTION

The present invention relates to a method and apparatus for managing aggregate flows of data in a differentiated services computer network.

Generally, the present invention improves fairness in a differentiated services (DS) network by enforcing congestion control at the edges of the network, rather than relying on congestion to accumulate at the core of the network This is done by establishing a credit system for each aggregate flow through the edge. Only if credit is available for the flow will data from an edge node be forwarded to the edge node's DS traffic conditioner where the data packets can be marked using DiffServ labels. If credit is not available, the data will be queued at the edge node.

Each time data belonging to an aggregate flow is forwarded to the traffic conditioner, the amount of credit for the flow is decremented. Credit for the flow is incremented only when control packets can be inserted into the flow. Specifically, the present invention establishes control flows associated with each aggregate flow. A control packet (i.e. a header packet) is injected into the flow for every fixed amount of data belonging to the flow. Credit generation, and hence the queueing of data at the edge, is thus determined by the state (or the congestion window) of the control flow.

In accordance with one aspect of the invention, a method of managing an aggregate flow of data between a first edge device and a second edge device, the first edge device and the second edge device being in packet communication with each other via a network core, comprises the steps of: maintaining an available credit for the aggregate flow, detecting data packets belonging to the aggregate flow at the first edge device, inserting control packets in the aggregate flow at the first edge device, marking the detected data packets and the control packets with labels in accordance with a differentiated services agreement, and controlling the forwarding of the detected data packets to the network core in accordance with the available credit.

In accordance with another aspect of the invention, an apparatus for managing an aggregate flow of data between a first edge device and a second edge device, the first edge device and the second edge device being in packet communication with each other via a network core, comprises: means for maintaining an available credit for the aggregate flow, means for detecting data packets belonging to the aggregate flow at the first edge device, means for inserting control packets in the aggregate flow at the first edge device, means for marking the detected data packets and the control packets with labels in accordance with a differentiated services agreement, and means for controlling the forwarding of the detected data packets to the network core in accordance with the available credit.

In accordance with a further aspect of the invention, an edge device comprises: an aggregate flow control coupled to receive packets from the packet forwarding architecture of the edge device, the aggregate flow control including a classifier that associates certain of the received packets with a plurality of aggregate flows between the edge device and a plurality of receiver edge devices in packet communication with the edge device via a network core, a flow control unit that determines whether to forward the associated certain packets in accordance with corresponding credit available for the plurality of aggregate flows and a control stack that inserts control packets in the aggregate flows and monitors their drop occurrence in the network core, the corresponding credit available for the aggregate flows being adjusted in correspondence with the monitored drop occurrence of the control packets, and a traffic conditioner coupled to receive packets from the aggregate flow control, the traffic conditioner being adapted to mark the associated certain packets and the control packets with differentiated service parameters in accordance with service level agreements corresponding to the aggregate flows.

BRIEF DESCRIPTION OF THE DRAWINGS

These and other aspects and features of the present invention will become apparent to those ordinarily skilled in the art upon review of the following description of specific embodiments of the invention in conjunction with the accompanying figures, wherein.

DETAILED DESCRIPTION OF THE PREFERRED EMBODIMENTS

The present invention will now be described in detail with reference to the drawings, which are provided as illustrative examples of the invention so as to enable those skilled in the art to practice the invention. Notably, the implementation of certain elements of the present invention may be accomplished using software, hardware or any combination thereof, as would be apparent to those of ordinary skill in the art, and the figures and examples below are not meant to limit the scope of the present invention. Moreover, where certain elements of the present invention can be partially or fully implemented using known components, only those portions of such known components that are necessary for an understanding of the present invention will be described, and detailed descriptions of other portions of such known components will be omitted so as not to obscure the invention. Further, the present invention encompasses present and future known equivalents to the known components referred to herein by way of illustration.

Figure 1:
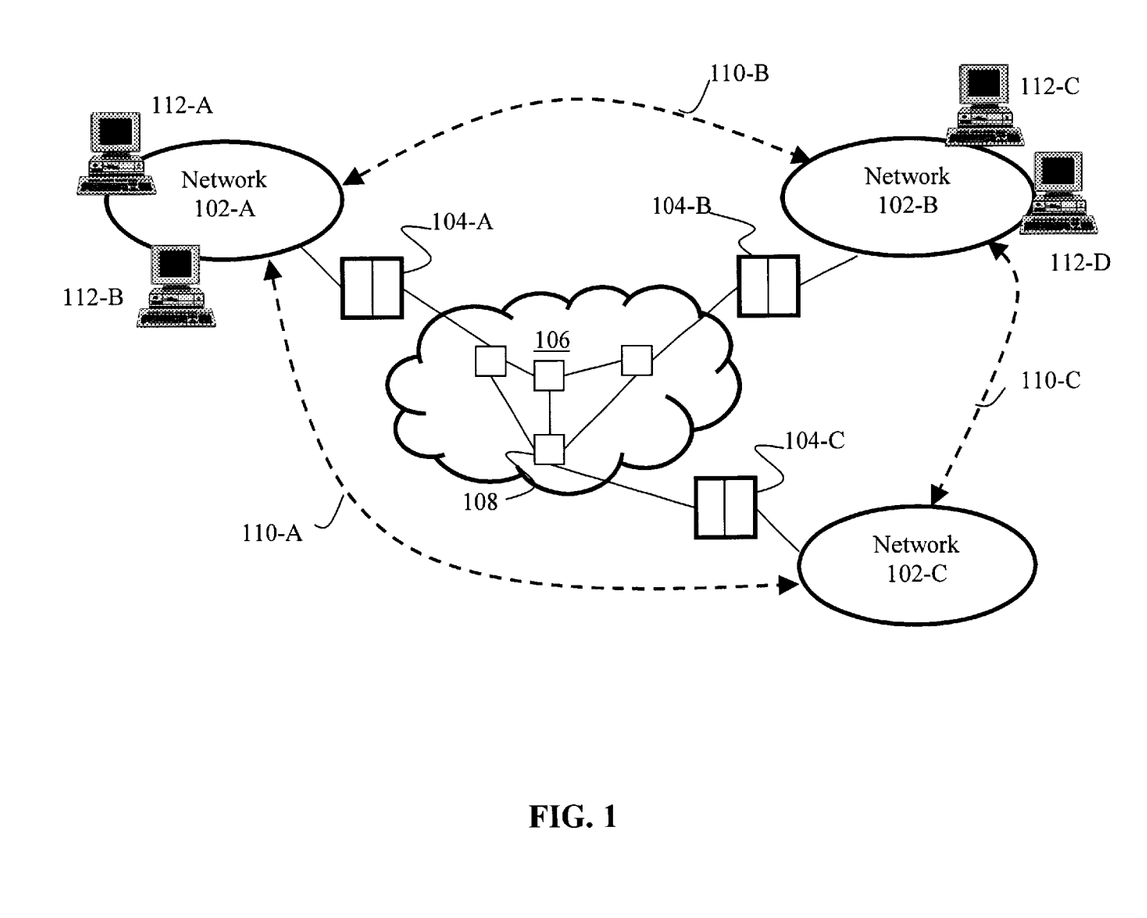
FIG. 1 illustrates a network topology in accordance with one example of the present invention.

FIG. 1 is a block diagram illustrating the topology of an implementation of one example of the invention in a network.

As shown in FIG. 1, customer networks 102-A, 102-B and 102-C all communicate with each other via a core data communications network 106 via respective edge routers 104-A, 104-B and 104-C. Network 106 includes conventional core routers and/or switches 108. Certain or all of the core routers and/or switches 108 employ differentiated services techniques such as the conventional Diffserv techniques consistent with the Internet Engineering Task Force (IETF) framework.

Edge routers 104 are, for example, the Passport 8000 series routing switches from Nortel Networks, the 7100 series and 1700 series routers from Cisco Systems, as well as other Diffserv capable routers from these and other such manufacturers as Juniper and Lucent. Generally, the edge routers 104 have been installed or adapted in accordance with the principles of the present invention to manage aggregate flows between them so as to prevent and reduce congestion at the core of the network 106. For example, as shown in FIG. 1, edge router 104-A has been installed or adapted to manage aggregate flow 110-A between networks 102-A and 102-C and aggregate flow 110-B between networks 102-A and 102-B. Likewise, edge router 104-B has been installed or adapted to manage aggregate flow 110-B between networks 102-A and 102-B and aggregate flow 110-C between networks 102-B and 102-C. Further, edge router 104-C has been installed or adapted to manage aggregate flow 110-A between networks 102-A and 102-C and aggregate flow 110-C between networks 102-B and 102-C.

It should be understood that the term "networks" as used herein with respect to networks 102 need not be limited to an actual network of hosts; rather, this term is used for ease of illustration. "Networks" 102 should be construed as any collection of hosts that intend to communicate with network 106 for purposes of defining an aggregate flow. In one example of the invention, networks 102 are implemented as LANs, WANs and/or subnets. However, other examples of the invention exist. For example, networks 102 can also include wireless networks and the like and edge router 104 can be a wireless gateway. It should be further apparent that one or more of networks 102 may belong to the same corporate enterprise network, virtual private network (VPN) or Intranet, or networks 102 may all be different company networks and core network 106 may be the DiffServ enabled Internet. Many other alternatives and variations are possible as will be understood by those skilled in the art.

Aggregate flows, as used herein, are a collection of network communication flows between two groups of one or more network hosts. For example, as further shown in FIG. 1, network 102-A includes hosts 112-A and 112-B, while network 102-B includes hosts 112-C and 112-D. Accordingly, the aggregate flow 110-B would include individual flows between hosts 112-A and 112-C, between hosts 112-A and 112-D, between hosts 112-B and 112-C, and between hosts 112-B and 112-D. However, the management of these flows by edge routers 104-A and 104-B is transparent to the hosts 112. Moreover, it should be noted that the individual flows can use various protocols, and need not use the protocol used by the edge routers 104 to manage the aggregates.

In the above example, networks 102-A and 102-B could be two separate company networks, each with one or more subnets/masks or simply lists of network addresses. In this case, double-ended service level agreements (SLAs) can be used to establish a known source and destination for all addresses belonging to the flow aggregate 110-B. It should be apparent that a flow aggregate need not include all network hosts that can be coupled to networks 102-A and 102-B.

Generally, the present invention operates in the following manner: (a) control connections are associated with each traffic aggregate 110 between networks 102; (b) control packets are injected into the network at the edge routers 104 to sense the congestion along the path of the aggregated data; (c) based on the packet drop occurrence of the control flow at the core routers 108, congestion control is enforced on the aggregated customer traffic at the edge router 104.

Control connections play the role of controlling the behavior of the aggregates between the edges. Although the aggregated customer traffic and its associated control packets are in separate flows, the customer traffic aggregate can be virtually viewed as payload of the control flows with the control packets as the headers. It is assumed that control packets and data packets are following the same path between the edge routers 104. Thus, it can be said that at the core, there are only a few special flows carrying customer aggregates between two edges.

Figure 2:
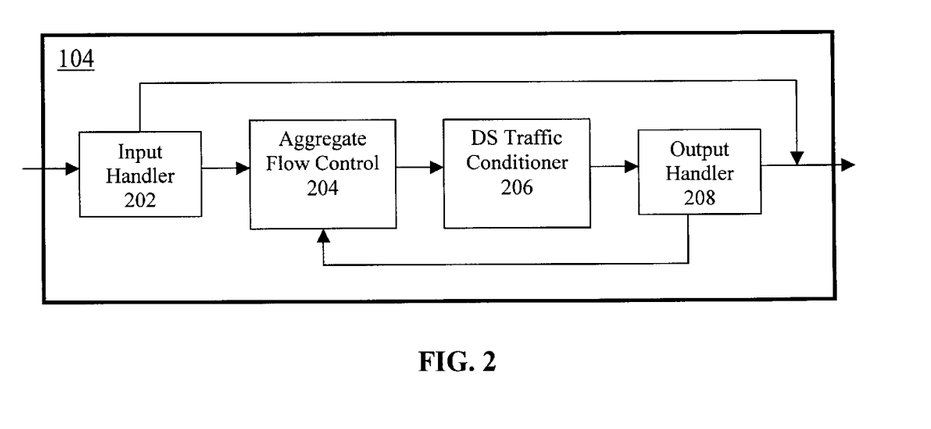
FIG. 2 is a block diagram illustrating an example edge device that can be included in a network configured in accordance with one embodiment of the present invention.

FIG. 2 illustrates an example of an edge router 104 in accordance with the present invention. It should be apparent, however, that edge router 104 can further include functionality and components found in conventional routers. Such conventional functionality and components will not be described here so as not to obscure the present invention.

As shown in FIG. 2, edge router 104 includes an input handler 202, an aggregate flow control (AFC) 204, a differentiated services (DS) traffic conditioner block 206, and an output handler 208. In one example of the invention, these components are implemented as software tasks executing on a CPU of edge router 104. The design of such software will become apparent to those skilled in the art in view of the following functional description. Other example implementations are possible, however, such as functional units in a switch fabric ASIC or the like.

In general, edge router 104 operates in the following manner. Input handler 202 monitors all packets received by the packet forwarding architecture of edge router 104 and determines which packets belong to aggregate flows that have been defined for handling by this edge router. Packets not belonging to such aggregate flows are passed on to the packet forwarding architecture without the processing of the present invention. AFC 204 inserts control packets in the aggregate flow(s) and monitors their drop occurrence at the network core 106. Depending on core congestion detected by AFC 204 for a particular aggregate flow, AFC 204 shrinks a congestion window associated with that aggregate flow, thus effectively reducing the rate for that aggregate. The data for the flow that is throttled at router 104 is queued in, for example, an associated queue in AFC 204 (other locations for queueing the data are possible). When credit is available for the flow, data is forwarded to DiffServ (DS) traffic conditioner 206 where the data packets are marked using DiffServ labels. Output handler 208 inserts the marked packets in the packet forwarding architecture of edge router 104, and as it does so it signals back to AFC 204 for any marked control packets that were successfully inserted. The present invention thus enforces congestion control at the edges of the network, rather than relying on congestion to accumulate at the core of the network.

Figure 3:
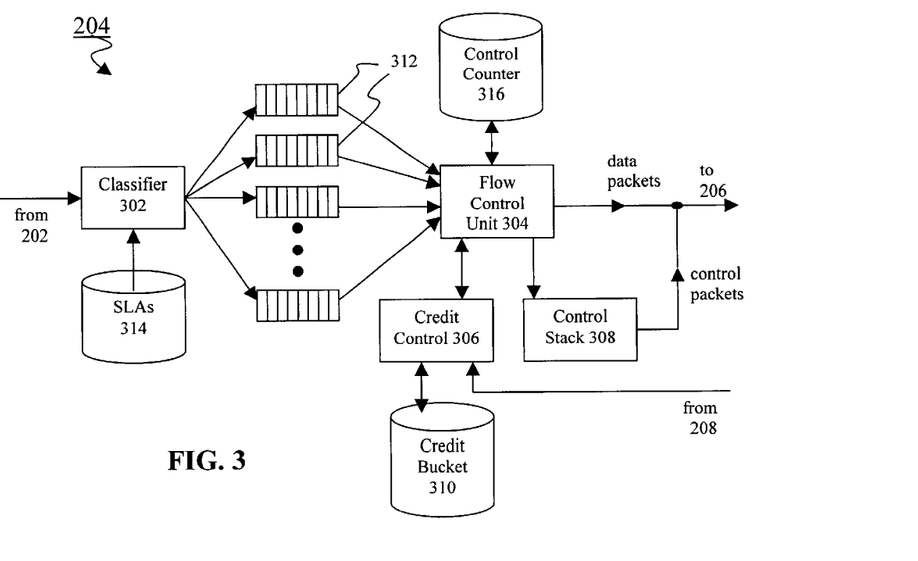
FIG. 3 is a functional block diagram illustrating an example aggregate flow control in an edge device in accordance with one embodiment of the present invention.

FIG. 3 illustrates an example of an aggregate flow control (AFC) 204 in accordance with the present invention.

As shown in FIG. 3, AFC 204 includes a classifier 302 that monitors packets to be transmitted. Classifier 302 inspects the headers of each packet and compares them to the SLA list 314 to determine whether the packet belongs to an aggregate flow. The amount of information from the headers that is inspected depends on how the SLA defines aggregate flows. For example, aggregates may be defined simply by source and destination addresses. However, there may exist more than one SLA defined between the same set of source and destination addresses, with different aggregates for different types of traffic, such as web traffic, video traffic, etc. If a packet belongs to one of the defined aggregates in the SLA list, it is forwarded to its appropriate aggregate queue 312.

Flow control unit 304 controls the forwarding of packets from the queues 312 to the core network 106 via traffic conditioner 206 and output handler 208 in accordance with the credit available for the particular aggregate flow as maintained in credit bucket 310 by credit control unit 306. Flow control unit 304 also causes control packets to be inserted into aggregate flows via controlstack 308 and output handler 208. Control stack 308 accordingly writes control packets for insertion into the appropriate aggregate flow and maintains TCP stacks and congestion windows in accordance with their delivery and acknowledgment from the flow receiver. Each time a control packet has been successfully processed by traffic conditioner 206 and inserted into the packet forwarding architecture, output handler 208 sends back a signal that causes credit control unit 306 to increment the credit available in credit bucket 310 for the corresponding aggregate flow. Credit for each aggregate flow is thus accumulated on the basis of successful insertion of control packets into the aggregate flow.

Credit control unit 306 decrements credit for an aggregate flow by the amount of data belonging to that flow forwarded to the traffic conditioner 206. AFC block 204 uses the notion of a virtual maximum segment size (vmss) for the control flow. As explained earlier, the data belonging to the aggregate flow is considered the payload for the control flow. The virtual maximum segment size for the control flow is the amount of aggregate flow data allowed for each credit (e.g., 1514 bytes of data) before a control packet is inserted.

Flow control unit 304 only allows data to be forwarded if there is credit available for the flow. The amount of credit available is generally dependent on the state (or the congestion window) of the virtual control connection, as monitored by control stack 308 as mentioned above, and as will be explained in more detail below. The flow control unit 304 also keeps a counter 316 for the number of bytes already forwarded for each aggregate since the last control packet was inserted. Flow control unit 304 adds the number of bytes to be forwarded to the value stored in counter 316 and causes control stack 308 to generate a control packet (i.e., inject a header packet addressed to the edge router 104 associated with the other end of the aggregate) every time the adjusted value in counter 316 exceeds vmss bytes.

Credit control unit 306 decrements the credit bucket for a particular aggregate with the number of bytes allowed to be forwarded by flow control unit 304. Credit control unit 306 also increments the amount of credit for an aggregate by one vmss upon the generation of a control packet for the aggregate, as monitored and fed back by the output handler 208. The loss of a control packet in the network will slow the transmission rate of control packets; and, because transmission of control packets determines the amount of credit available for the aggregate, the loss of the control packet will thus cause flow control unit 304 to slow the transmission of data belonging to that aggregate.

In one example of the invention, control stack 308 is a conventional TCP New Reno stack and maintains stacks and congestion windows for each control flow in accordance with TCP's Additive Increase and Multiplicative Decrease (AIMD) congestion control mechanism. In operation, control stack 308 maintains several (e.g. four) control flows for each aggregate. If control stack 308 were to regulate each aggregate with a single control flow, the loss of a single control packet would cause the congestion window for the entire aggregate to be halved. When dealing with large traffic aggregates, such congestion control is too harsh. Instead of one control flow, therefore, in one example of the invention, multiple control flows are used for each aggregate. Consider an aggregate that is managed by four control flows. If one of those flows loses a packet, that flow halves its congestion window; but the other flows are unaffected. Since only one of the four congestion windows that control an aggregate is halved, the aggregate's effective control window will only be cut by one-eighth.

It should be noted that generally there is a practical limit to how many control flows should be used. Given a fixed queue size at the core routers, increasing to an arbitrarily high number of control flows implies that many of those flows will be in a slow-start state. The present inventors have determined that four control flows produces smooth behaviour, and fixing the number of control flows allows core Random Early Detection (RED) parameters to be chosen.

Initially, the credit for each aggregate flow stored in credit bucket 310 is set to n+1 vmss, where n is the number of control flows maintained for the aggregate. Assume that vmss is 1514 bytes and that the user sends 1024-byte packets. If the credit was initialized to only one vmss, the first packet would drain 1024 bytes from the bucket. The second user packet could not be sent, since the remaining credit would be 490 bytes. No control packet would be generated either because vmss bytes of user data have not yet been sent. No credit update would cause a deadlock. Since the initial credit is instead set to n+1 vmss, the second user packet and a control packet will be transmitted, and vmss TCP credit will be added. If an aggregate flow is throttled, the amount of data in its associated data queue 312 will grow. In one example of the invention, a single level RED can be used at these queues for packet dropping. However, it should be apparent that other queue management techniques may also be used.

In the example of the invention where several control flows are associated with each aggregate, control stack 308 assigns control packets to the several control flows in a round-robin fashion. In other words, the first time that flow control unit 304 signals control stack 308 to insert a control packet for an aggregate, control stack 308 sets up a first control flow. For the next signal from flow control unit 304, control stack 308 sets up a second control flow. This process continues for subsequent signals from flow control unit 304 until all control flows have been started. Accordingly, upon the next signal from flow control unit 304, control stack 308 inserts a second control packet into the first control flow, and the round-robin process continues for subsequent signals. Additionally or alternatively, the control stack will skip any flow with a packet pending in the stack (e.g. because the packet has not yet reached the output handler). This will prevent shared TCP credit from being consumed on a control packet that is guaranteed to wait in the stack behind another pending control packet. Thus, a packet drop in one control flow does not block the other control flows.

Although FIG. 3 shows only classifier 302 as having access to information in list 314, it should be noted that other of elements in AFC 204, as well as elements in other components of router 104, may have access to SLA information, as should be apparent to those skilled in the art.

Figure 4:
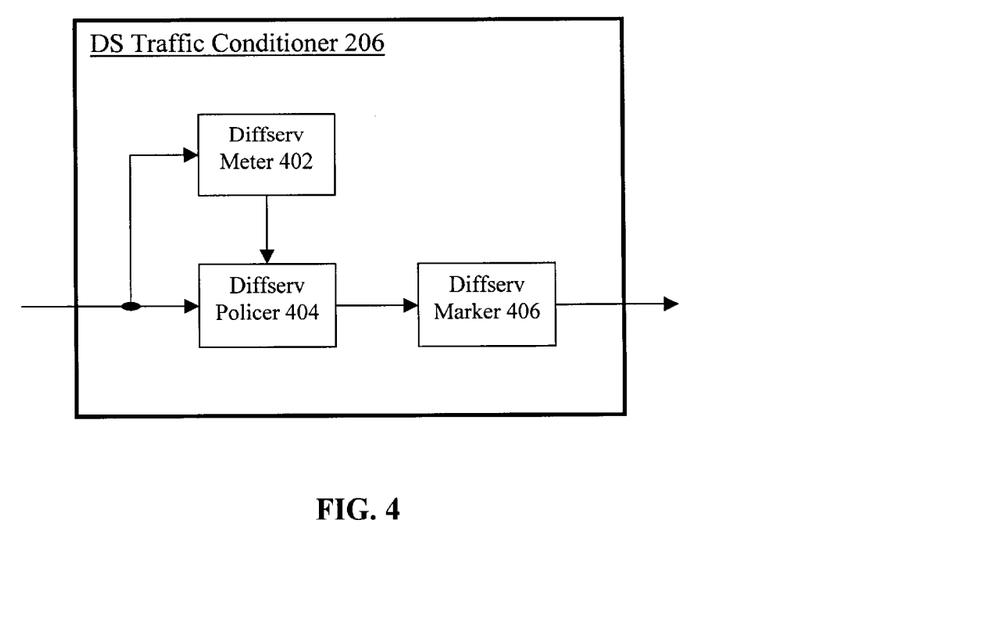
FIG. 4 is a functional block diagram illustrating an example traffic conditioner in an edge device in accordance with one embodiment of the present invention.

FIG. 4 illustrates an example of DS traffic conditioner 206 in accordance with the present invention. As shown in FIG. 4, DS traffic conditioner 206 includes a DS meter 402, a DS policer 404 and a DS marker 406.

As set forth in more detail above, data arrives at DS traffic conditioner 206 only if the, AFC block 204 allows the data to proceed. The data for each aggregate flow and its associated control packets entering DS traffic conditioner 206 are metered by DS meter 402 to determine the rate at which packets are being forwarded. DS policer 404 compares the rate of packets with the authorized rates in the SLA for the aggregate. (It should be noted that the same or similar classifier 302 may be used in DS traffic conditioner 206 to map a packet to its corresponding SLA in list 314). DS marker 406 then marks each packet with DiffServ labels in accordance with the determination made by DS policer 404. It should be noted that DS traffic conditioner 206 marks both control packets and regular aggregate data packets. An underlying assumption is that control packets follow the same path as their associated data packets. In one example of the invention, conventional Diffserv techniques are used to implement the components in Traffic conditioner 206, such as the Diffserv techniques that are consistent with the Internet Engineering Task Force (IETF) framework. However, it should be apparent that non-standard or proprietary Diffserv techniques and their equivalents may be employed in traffic conditioner 206.

Figure 5:
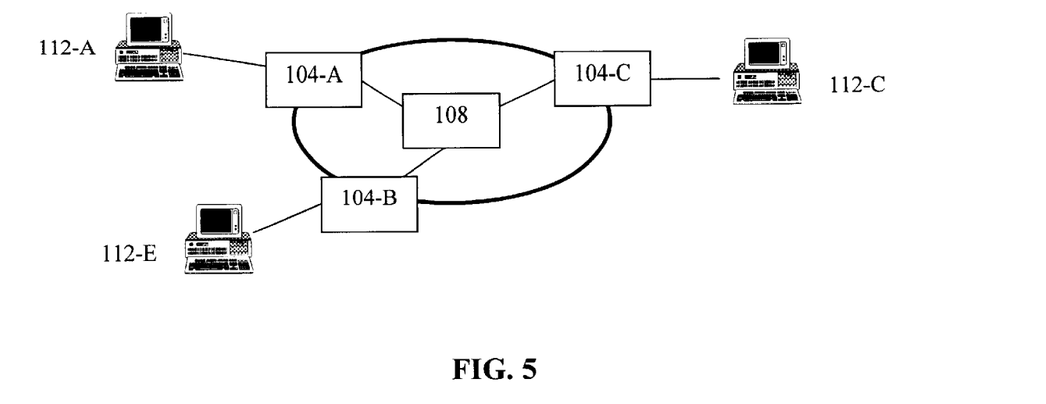
FIG. 5 is an example topology of a network for the purpose of illustrating an aggregated flow control mechanism in accordance with an embodiment of the present invention.

The aggregated flow control mechanism in a Diffserv network in accordance with the present invention can be further explained with an example, using the example topology illustrated in FIG. 5. Consider the case of the two traffic aggregates, the first including customer traffic between edge routers 104-A and 104-C and the second including customer traffic between edge routers 104-B and 104-C. Thus, each aggregate passes through the same core router 108.

Assume that router 104-A receives first aggregate traffic from hosts 112-A below the committed information rate (CIR) for the aggregate and that router 104-B receives second aggregate traffic from hosts 112-E above the peak information rate (PIR) for that aggregate, as set forth in the SLAs establishing the aggregates. The bottleneck link is between the core and edge router 104-C, and assume that it can only support the committed information rates for the customers. The first aggregate's traffic is thus marked by router 104-A with drop precedence dp0, and traffic in the second aggregate is marked by router 104-B with dp0, dp1, and dp2. Each aggregate's control packets are marked in the same manner as its data packets.

Congestion at the core causes dp2 traffic to be dropped with a higher probability. Due to the drop of dp2 control packets, the control stack 308 in edge router 104-B causes the congestion window associated with the second aggregate to be reduced, thus causing packets to be queued back at edge router 104-B. Thus, at the core of the network, when there is no congestion, no data or control packets are dropped. The AFC 204 at each edge router 104 thus allows increased data traffic by following TCP's Additive Increase and Multiplicative Decrease (AIMD) congestion control mechanism. As soon as a control packet is dropped, the virtual control TCP in the associated edge router 104 throttles the flow of customer data (following the AIMD mechanism) by limiting the availability of credit at the credit meter.

It should be apparent that the congestion control of the present invention has many advantages. First, fairness and data transparency are preserved since each aggregate can contain many types of packet sizes, numbers of microflows, and data protocol types that are not or can not be fairly controlled by TCP. Accordingly, regardless of the content of the first and second aggregates between edge routers 104-A, 104-B and 104-C, conforming aggregates will not be punished merely because of differing treatment in the network for different types of packet sizes, numbers of microflows, and data protocol types.

Further, delay and jitter are improved for conforming flows. This is because the AFC 204 in edge routers 104-A and 104-B will reduce the queue length at the shared core router 108 and push it onto only 104-B. First aggregate traffic from 104-A, which is conforming to its profile, therefore receives better service. In other words, packets belonging to the first aggregate from router 104-A will not be dropped merely because the offending second aggregate traffic from router 104-B is consuming excessive resources of the shared core router 108. Accordingly, such time and delay sensitive issues such as short-lived TCP flows and streaming UDP traffic are improved for conforming aggregates such as first aggregate traffic from 104-A.

The benefits of the AFC congestion control of the present invention as illustrated in connection with the example in FIG. 5 of one possible core congestion point can become even more profound when multiple congestion points in the network exist.

Figure 6A:
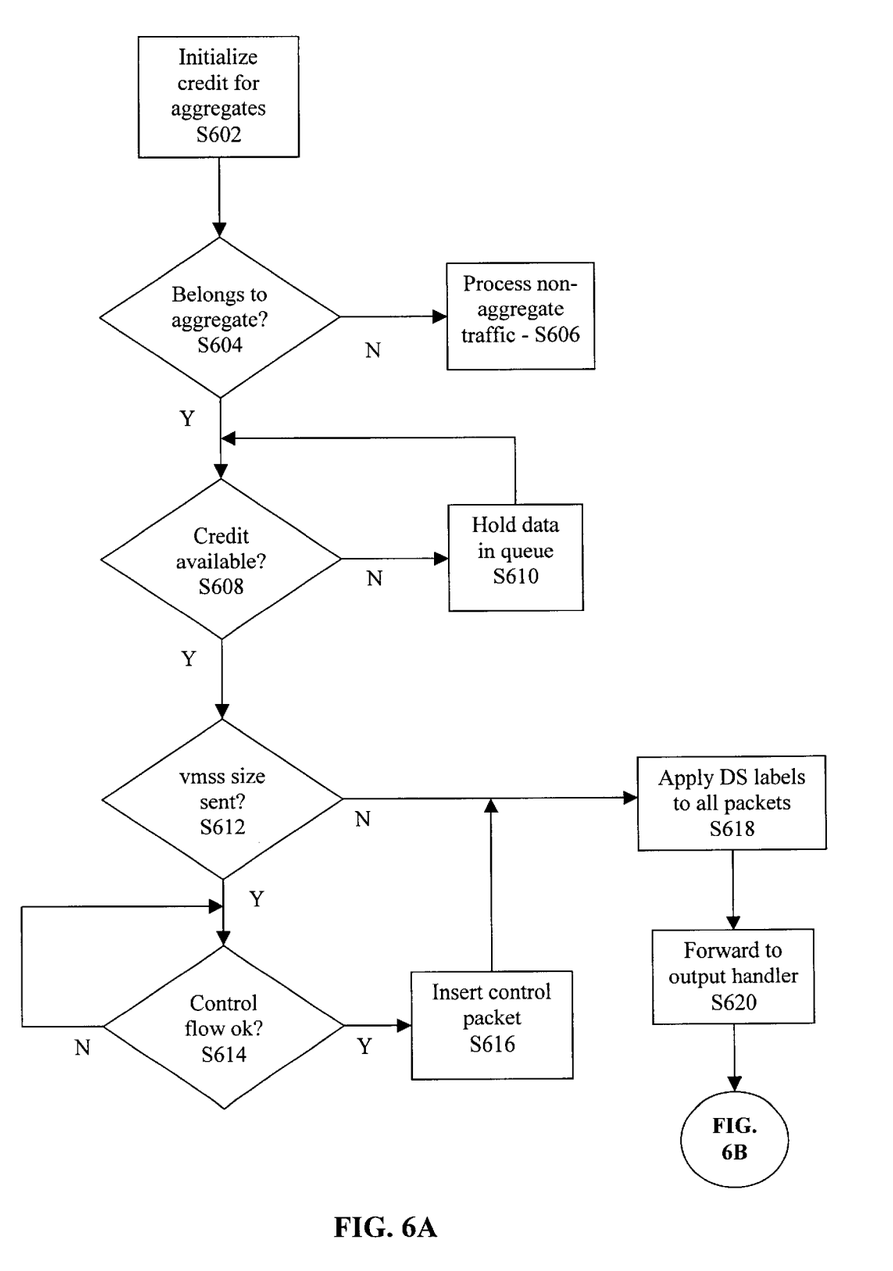
FIGS. 6A and 6B provide a flowchart illustrating an example method of performing aggregate flow control in accordance with one embodiment of the present invention.
Figure 6B:
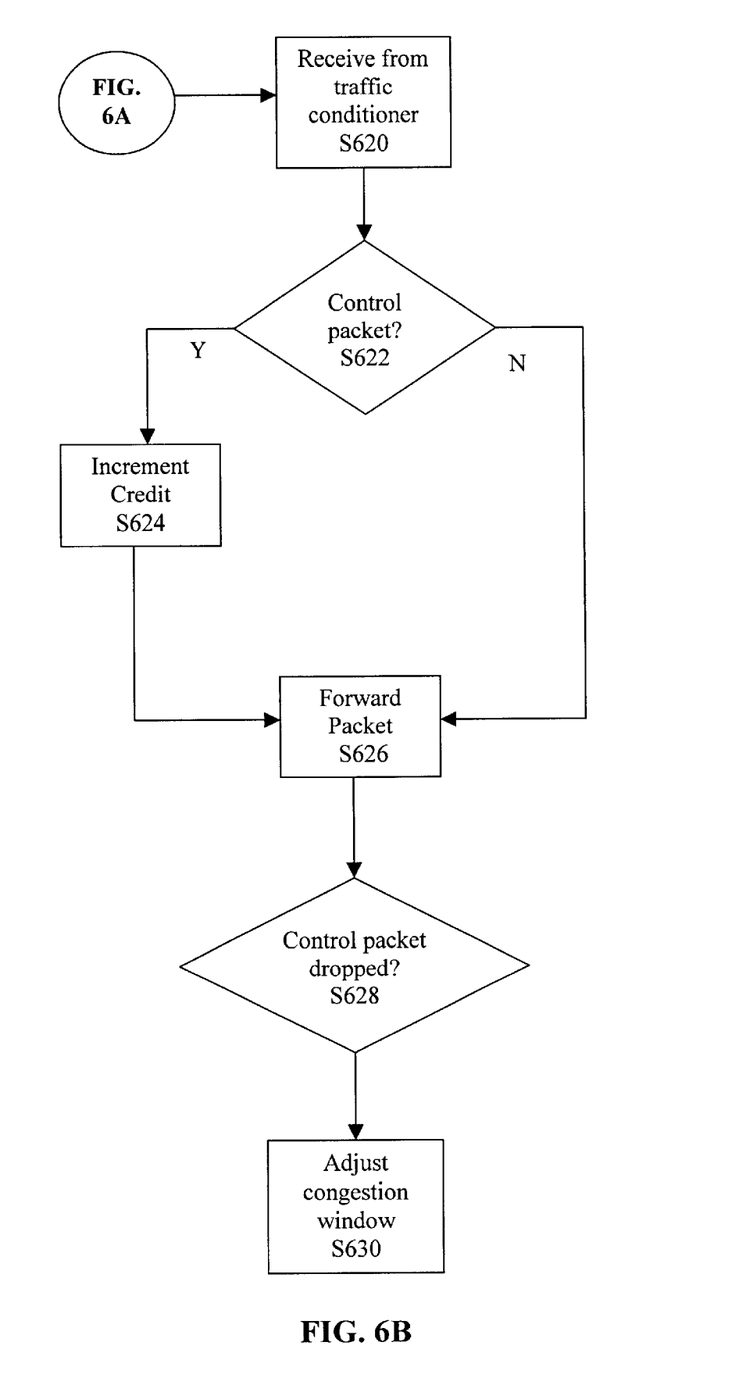

FIGS. 6A and 6B provide a flowchart illustrating an example method of performing aggregate flow control in accordance with one embodiment of the present invention.

As shown in FIG. 6, in block S602 the credit for each aggregate is initialized, for example to n+1 vmss bytes, where n is the number of control flows per aggregate. Accordingly, for an example with 1514 bytes as the value for vmss, and n equal to 4, each aggregate's credit is initialized to 7570 bytes. It should be apparent, however, that each aggregate need not receive the same initial credit and/or that values of vmss can differ per aggregate.

The remaining blocks are provided as an illustration of the processing for one packet. However, it should be apparent that the remaining blocks are repeated during operation for each packet. Specifically, each packet that is about to be forwarded from the edge is screened to determine whether it belongs to one of the aggregates (block S604). If not, no aggregate processing needs to be performed for this packet, so it is not processed by the AFC of the present invention (block S606) (it may still be forwarded by the device, however). If it does belong to an aggregate (determined in block S604), processing continues to block S608, where it is determined whether credit is available for the aggregate. That is, if the packet is 1024 bytes, and if the credit available for the aggregate is greater than or equal to 1024 bytes, there is sufficient credit available. If the credit available is less than the packet size, it is queued (block S610). A queue management algorithm such as RED is used on the queues, and data is periodically read out in a first-in, first-out fashion for the determination in block S608. If there is sufficient credit available, the data can be forwarded. In block S612 it is next determined whether a number of bytes corresponding to the vmss size, including the outgoing packet, has been sent for this aggregate since the last control packet. If so, at this point a control packet should be inserted into the aggregate. Accordingly, processing advances to block S614 where it is determined whether the current congestion window permits insertion of the control packet into the network. Stack processing such as TCP controls whether control packets can be sent for each of the n control flows for this aggregate, as indicated by the loop around block S614. When a control packet can be inserted, processing advances to block S616 and the control packet is prepared and sent. Processing advances to block S618 from either block S612 or block S616, depending on the segment size counter. In either event, both the control packet and the user packets are forwarded for Differentiated Services processing, which can include marking the user and control packets with DS labels. After labeling, all packets are forwarded to the output handler (block S620), where it is first determined whether the packet to be forwarded is a control packet (block S622). If it is a control packet, credit for the aggregate is incremented by vmss bytes (block S624). Both control packets and data packets are then forwarded on to the network (block S626). If the control packet is dropped (determined in block S628), the congestion window for the control flow associated with the packet and aggregate is adjusted, in accordance with AIMD techniques for example (block S630).

Although the present invention has been particularly described with reference to the preferred embodiments thereof, it should be readily apparent to those of ordinary skill in the art that changes and modifications in the form and details may be made without departing from the spirit and scope of the invention. It is intended that the appended claims include such changes and modifications.

What is claimed is:

1. A method:
   of managing an aggregate flow of data between a first edge device and a second edge device in packet communication with each other via a network core, the method comprising the steps of:

maintaining an available credit for the aggregate flow;

detecting a data packet belong to the aggregate flow at the first edge device;

checking whether a control packet can be inserted in the aggregate flow in accordance with a congestion window maintained for a control flow associated with the aggregate flow;

inserting a control packet in the aggregate flow at the firs edge device;

marking the detected data packet with a label and marking the control packet with the label, the label being determined in accordance with a differentiated services agreement; and controlling the forwarding of the detected data packet to the network core in accordance with the available credit; and adjusting the available credit in accordance with a result of the checking step and a completion signal associated with the inserting step.

2. A method of managing an aggregate flow of data between a first edge device and a second edge device in packet communication with each other via a network core, the method comprising the steps of:

maintaining an available credit for the aggregate flow;

detecting a data packet belonging to the aggregate flow at the first edge device;

inserting a control packet in the aggregate flow at the first edge device;

marking the detected data packet with a label and marking the control packet with the label, the label being determined in accordance with a differentiated service agreement; and controlling the forwarding of the detected data packet to the network core in accordance with the available credit;

wherein the control packet uses the Transmission Control Protocol (TCP).

3. A method according to claim 2, wherein the detected data packet does not use TCP.

4. A method according to claim 1, wherein the control flow uses the Transmission Control Protocol (TCP).

5. A method according to claim 4, wherein the detected data packet does not use TCP.

6. A method according to claim 1, further comprising the step of:

maintaining a virtual maximum segment size for the control flow, wherein the adjusting step includes the step of incrementing the available credit in accordance with the virtual maximum segment size if and when the control packet is inserted.

7. A method of managing an aggregate flow of data between a first edge device and a second edge device in packet communication with each other via a network core, the method comprising the steps of:

maintaining available credit for the a late flow;

associating a plurality of control flows with the aggregate flow;

detecting a data packet belonging to the aggregate flow at the first edge device;

inserting a control packet in the aggregate flow at the first edge device;

assigning the control packet to a certain one of the control flows; and checking whether the control packet can be inserted in the aggregate flow in accordance with a congestion window maintained for the certain control flows;

inserting a control packet in the aggregate flow at the first edge device; marking the detected data packet with a label and marking the control packet with the label, the label being determined in accordance with a differentiated services agreement; and controlling the forwarding of the detected data packet to the network core in accordance with the available credit.

8. A method according to claim 7, further comprising the step of adjusting the available credit in accordance with a result of the checking step and a completion signal associated with the inserting step.

9. A method according to claim 7, wherein the certain control flow uses the Transmission Control Protocol (TCP).

10. A method according to claim 9, wherein the detected data packet does not use TCP.

11. An apparatus for managing an aggregate flow of data between a first edge device and a second edge device in packet communication with each other via a network core, the apparatus comprising:

means for maintaining an available credit for the aggregate flow;

means for detecting a data packet belonging to the aggregate flow at the first edge device;

means for checking whether a control packet can be inserted in the aggregate flow in accordance with a congestion window maintained for a control flow associated with the aggregate flow;

means for inserting a control packet in the aggregate flow at the first edge device;

means for marking the detected data packet with a label and for marking the control packet with a label, the label being determined in accordance with a differentiated services agreement; and means for controlling the forwarding of the detected data packet to the network core in accordance with the available credit; and means for adjusting the available credit in accordance with a result provided by the checking means and a completion signal generated by the inserting means.

12. An apparatus for managing an aggregate flow of data between a first edge device and a second edge device in packet communication with each other via network core, the apparatus comprising:

means for maintaining an available credit for the aggregate flow;

means for detecting a data packet belonging to the aggregate flow at the first edge device;

means for inserting a control packet in the aggregate flow at the first edge device;

means for marking the detected data packet with a label and for marking control packet with a label the label being determined in accordance with a differentiated services agreement; and means for controlling the forwarding of the detected data packet to the network core in accordance with the available credit;

wherein the control packet uses the Transmission Control Protocol (TCP).

13. An apparatus according to claim 12, wherein the detected data packet does not use TCP.

14. An apparatus according to claim 11, wherein the control flow uses the Transmission Control Protocol (TCP).

15. An apparatus according to claim 14, wherein the detected data packet does not use TCP.

16. An apparatus according to claim 11, further comprising:

means for maintaining virtual maximum segment size for the control flow, wherein the adjusting means includes means for incrementing the available credit in accordance with the virtual maximum segment size if the control packet can be inserted.

17. An apparatus according to claim 16, further comprising:

means for decrementing the available credit by an amount corresponding to the size of the detected data packet forwarded to the network core.

18. An apparatus for managing an aggregate flow of data between a first edge device and a second edge device in packet communication with each other via a network core the apparatus comprising;

means for maintaining an available credit for the aggregate flow;

means for associating a plurality of control flows with the aggregate flow;

means for detecting a data packet belonging to the aggregate flow at the first edge device;

means for assigning a control packet to a certain one of the control flows; and means for checking whether the control packet can be inserted in the aggregate flow in accordance with a congestion window maintained for the certain control flow;

means for inserting the control packet in the aggregate flow at the first edge device;

means for marking the detected data packet with a label and for marking the control packet with a label, the label being determined in accordance with a differentiated services agreement; and means for controlling the forwarding of the detected data packet to the network core in accordance with the available credit.

19. An apparatus according to claim 18, further comprising:

means for adjusting the available credit in accordance with a result provided by the checking means and a completion signal generated by the inserting means.

20. An apparatus according to claim 30, wherein the certain control flow uses the Transmission Control Protocol (TCP).

21. An apparatus according to claim 20, wherein the detected data packet does not use TCP.

22. An edge device comprising:

an aggregate flow control coupled to receive packets from the packet forwarding architecture of the edge device, the aggregate flow control including:

a classifier that associates certain of the received packets with a plurality of aggregate flows between the edge device and a plurality of receiver edge devices in packet communication with the edge device via a network core;

a flow control unit that determines whether to forward the associated certain packets in accordance with corresponding credit available for the plurality of aggregate flows; and a control stack that associates control flows with the aggregate flows and inserts control packets in the aggregate flows in accordance with TCP congestion windows maintained by the control stack for the associated control flows, the corresponding credit available for the aggregate flows being adjusted in correspondence with the success of inserting the control packets in the aggregate flows; and a traffic conditioner coupled to receive packets from the aggregate flow control, the traffic conditioner being adapted to mark the associated certain packets and the control packets with differentiated service parameters in accordance with service level agreements corresponding to the aggregate flows.

23. An edge device according to claim 21, wherein the aggregate flow control further includes a plurality of queues respectively associated with the plurality of aggregate flows, the flow control unit causing the associated certain packets to be stored in corresponding ones of the queues if there is insufficient corresponding available credit.

24. An edge device according to claim 21, wherein the aggregate flow control further includes a credit control that maintains the corresponding credit available for the plurality of aggregate flows.

25. A network comprising:

a network core including at least one Differ router;

a first edge router coupled to the network core;

a second edge router coupled to the network core, an aggregate flow being defined for packets traversing the network core and the first and second edge routers, the second edge router being adapted to insert control packets addressed to the fist edge router into the aggregate flow and to mark both the control packets and regular data packets for the aggregate flow with Diffserv parameters in accordance with service levels established for the aggregate flow, the second edge router including a TCP stack to monitor the drop occurrence of the control packets in the network core, the forwarding of packets belonging to the aggregate flow to the network core being adjusted at the second edge router in accordance with the drop occurrence of the control packets so that congestion at the core of the network is reduced.

* * * * *